(12) United States Patent
Meaney et al.

(10) Patent No.: US 8,195,986 B2
(45) Date of Patent: Jun. 5, 2012

(54) METHOD, SYSTEM AND COMPUTER PROGRAM PRODUCT FOR PROCESSING ERROR INFORMATION IN A SYSTEM

(75) Inventors: Patrick J. Meaney, Poughkeepsie, NY (US); Mark S. Farrell, Pleasant Valley, NY (US); Liyong Wang, Morrisville, NC (US); Rebecca S. Wisniewski, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 12/036,745

(22) Filed: Feb. 25, 2008

(65) Prior Publication Data

US 2009/0217108 A1    Aug. 27, 2009

(51) Int. Cl.
*G06F 11/00* (2006.01)
(52) U.S. Cl. .......................................................... 714/48
(58) Field of Classification Search .................. 714/48
See application file for complete search history.

(56) References Cited

U.S. PATENT DOCUMENTS

| | | | |
|---|---|---|---|
| 5,594,861 A * | 1/1997 | Jonsson et al. | 714/2 |
| 5,704,034 A * | 12/1997 | Circello | 714/38 |
| 6,550,020 B1 * | 4/2003 | Floyd et al. | 714/10 |
| 2003/0074650 A1 * | 4/2003 | Akgul et al. | 717/129 |
| 2004/0078732 A1 * | 4/2004 | Meaney | 714/57 |
| 2006/0010352 A1 * | 1/2006 | Mukherjee et al. | 714/47 |
| 2006/0048005 A1 | 3/2006 | Gollub et al. | |

* cited by examiner

*Primary Examiner* — Scott Baderman
*Assistant Examiner* — Yair Leibovich
(74) *Attorney, Agent, or Firm* — Cantor Colburn LLP; John Campbell

(57) ABSTRACT

A system for processing errors in a processor comprising, a first register having a unique identifier operative to store a first error data, a processor operative to retrieve the first error data from the first register, associate the first error data with the unique identifier, and generate a first uniform error packet including the first error data and the unique identifier and a storage medium operative to store the first uniform error packet.

15 Claims, 4 Drawing Sheets

METHOD, SYSTEM AND COMPUTER PROGRAM PRODUCT FOR PROCESSING ERROR INFORMATION IN A SYSTEM

BACKGROUND OF THE INVENTION

This invention relates generally to processing error information, and more particularly to saving, extracting, and compiling error information in a computer system.

Microprocessor systems often capture error information in fault isolation registers and trap registers. Using software code specifically tailored to find specific errors in the registers allows operators to compile and analyze errors.

It would be desirable that a system and method allow operators to easily retrieve and compile errors for processing.

BRIEF SUMMARY OF THE INVENTION

An exemplary embodiment includes a system for processing errors in a processor comprising, a first register having a unique identifier operative to store a first error data, a processor operative to retrieve the first error data from the first register, associate the first error data with the unique identifier, and generate a first uniform error packet including the first error data and the unique identifier and a storage medium operative to store the first uniform error packet.

An exemplary method includes a method for analyzing processor error data comprising, determining if an error has occurred in a processor, retrieving a first error data stored in a first register, associating the first error data stored in the first register with a unique identifier of the first register, and saving the first error data with the unique identifier of the first register.

An exemplary embodiment of a computer program product for providing real-time recommendations, the computer program product comprising, a computer-readable storage medium for storing instructions for executing a real-time recommendation service, the real-time recommendation service comprising a method of, determining if an error has occurred in a processor, retrieving a first error data stored in a first register, associating the first error data stored in the first register with a unique identifier of the first register, and saving the first error data with the unique identifier of the first register.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides improved error detection and analysis in a processor.

Processors often include registers such as, for example, fault isolation registers and trap registers that are used to save fault data from the processor. When faults are detected, they may be analyzed by retrieving the fault data from the fault isolation registers. The fault data is often retrieved by writing code that specifically finds fault data in registers associated with a particular error. This method is cumbersome because the fault registers are not identified by a uniform system that allows code to be easily adapted to access data for a given error. Additionally, once the fault data is retrieved from a fault isolation register, the fault isolation register is reset. Though the data is useful for analyzing a given error, if the data in the fault isolation register also contains data associated with mother error, the data for that other error may be lost, resulting in inefficient error analysis for the unknown error. It is desirable for a method and system that allows simple access to error data in fault isolation registers, and allows the error data in the registers to be easily archived for later error analysis.

Figure 1A:
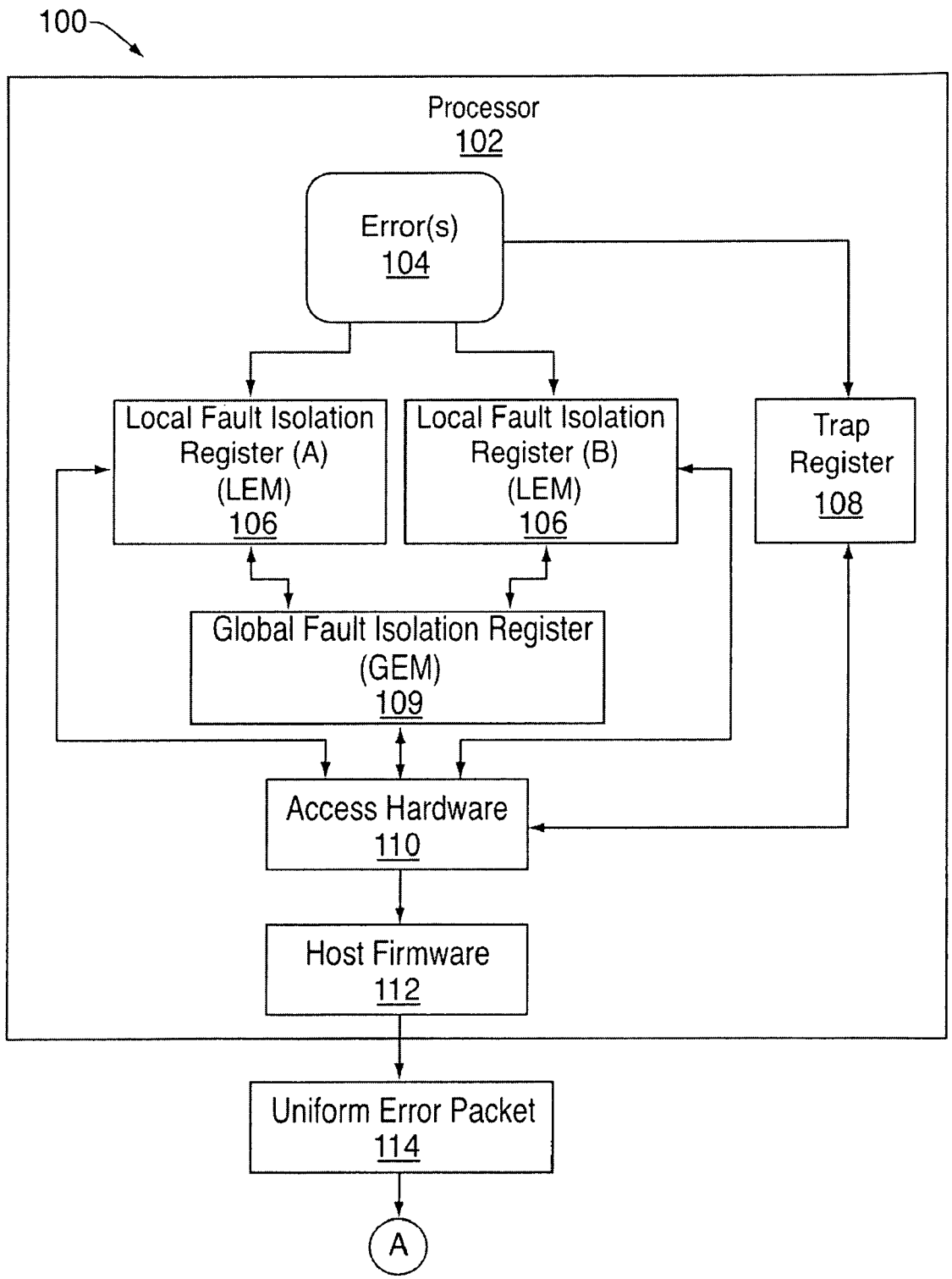
FIGS. 1a and 1b illustrate an exemplary embodiment of a processor system.
Figure 1B:
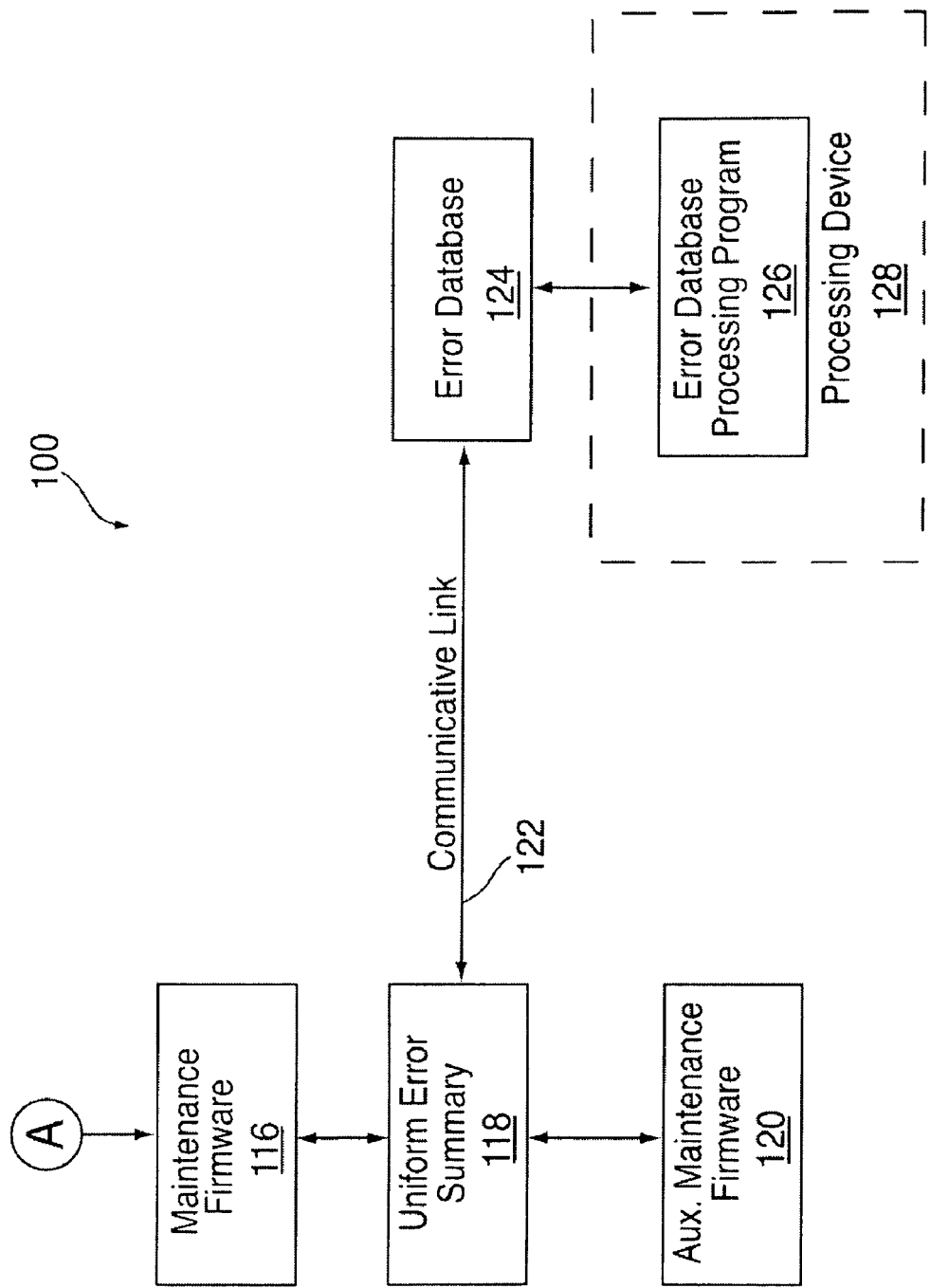

In this regard, an exemplary embodiment of a system 100 for error analysis is illustrated in FIG. 1a-1b. Referring to FIG. 1a, System 100 includes a processor 102 having a global fault isolation register 109, local fault isolation registers 106, trap registers 108, access hardware 110 and host firmware 112. In operation, error data 104 are sent to the local fault isolation registers 106 that store failure indications and the trap registers 108 that store detailed error data. The local fault isolation registers 106 indicate the error condition to the global isolation register 109 that summarizes die status of the local fault isolation registers 106. The access hardware 110 is used to access the error data on the registers and can reset the registers once the error data is received. The access hardware 110 is controlled by the host firmware 112.

The global fault isolation register 109, the fault isolation registers 106, and the trap registers 108 have unique identifiers that identify each register in the system 100. The unique identifiers may be based, for example, on a hierarchical or linear identification system depending on the design of the processor 102. The use of unique identifiers allows the host firmware 112 to be easily directed to retrieve error data from the registers.

One method of retrieving error data from the registers is to use a serial interface to stream data out of the machine. Another method is to use a parallel protocol to access the registers via a local bus. The host firmware 112 is used to compile LEM, GEM, and trap register information and output a Uniform Error Packet (UEP) 114. The UEPs may also contain a time that the error data was retrieved from the registers, assisting in archiving the error data and in later analysis.

The UEPs are sent to maintenance firmware 116 (shown in FIG. 1b). The maintenance firmware compiles the UEPs into a uniform error summary 118 that may, for example, be a data file. Auxiliary maintenance firmware 120 is used to direct the processor 102 to send error data for the uniform error summaries to an error database 124 via a communicative link 122. An error database processing program 126 may be used, for example, on a processing device 128 that may access the error database 124 and analyze the error data in the uniform error summaries 118 saved on the error database 124.

In the system 100, the error database 124 is used to accumulate error data for multiple computer machines. In the case of multiple machines, specific machine characteristics should also be associated with the Uniform Error Summary information 118 for helping to identify where the errors occurred.

Figure 2A:
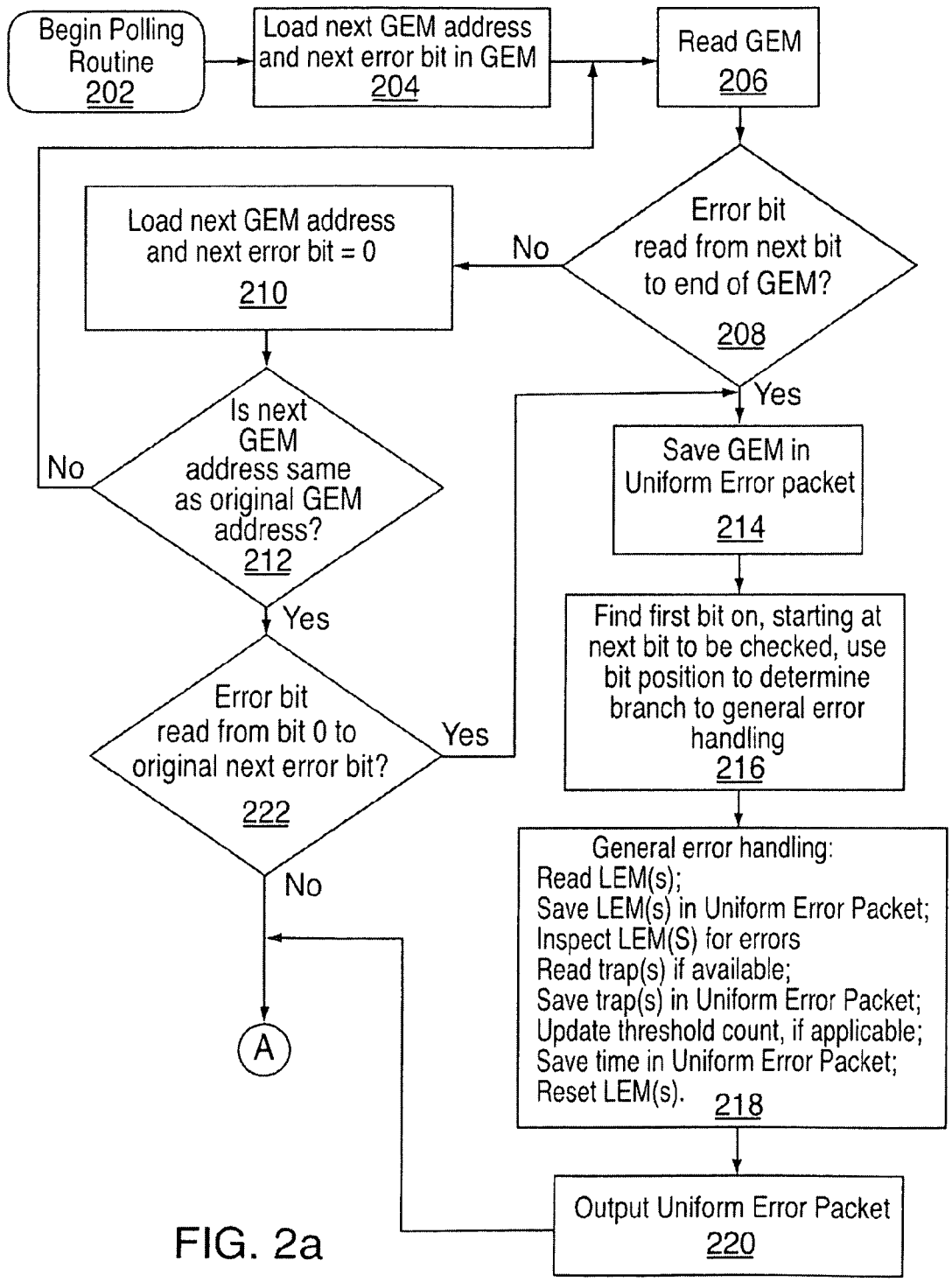
FIGS. 2a and 2b illustrate an exemplary embodiment of method for error detection in a microprocessor system.
Figure 2B:
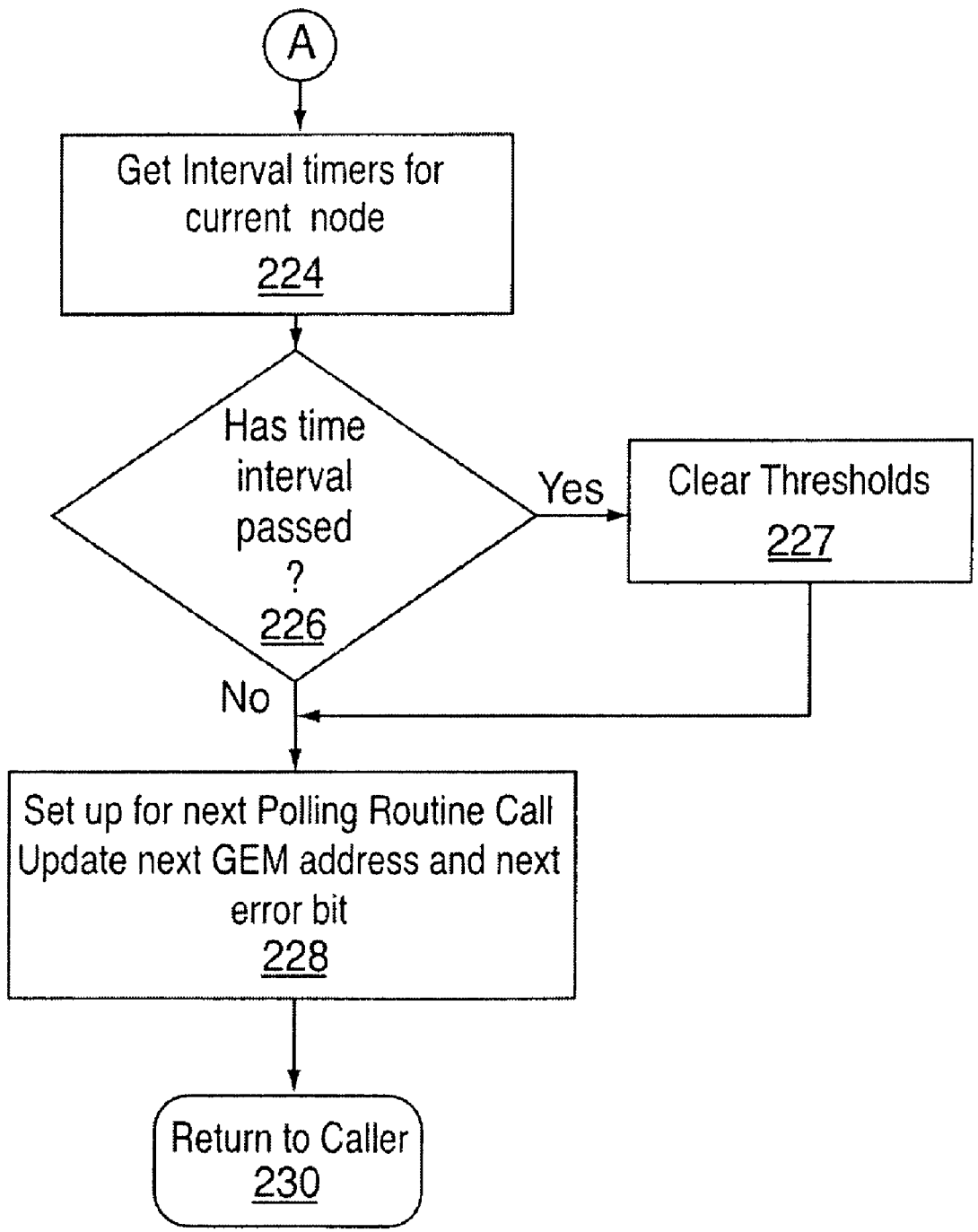

FIGS. 2a and 2b illustrate a block diagram of an exemplary method (polling routine) for retrieving error data from the registers (of FIG. 1a) and compiling Uniform Error Packets. A polling routine for error data is begun in block 202. In block 204 a next GEM address and next GEM bit is loaded by the host firmware 112. The next GEM is read in block 206. If there is an error bit in the range between the next GEM bit and the end of the GEM that is active as tested in block 208, the polling routine moves to block 214. If there are no error bits in the range between the next GEM bit and the end of the GEM that are active as tested in block 208, the next GEM address is loaded by the host firmware 112 and the next GEM bit is set to zero, as shown in block 210. In block 212 it is determined whether the next GEM address is the same as the original next GEM address that was loaded prior to the initiation of the polling routine. If the next GEM address is not the same as the original GEM address, the polling routine returns to block 206 to read the next GEM in the list of GEMs. If the next GEM address is the same as the original GEM address, the polling routine determines whether there is an error bit active within the GEM up to the bit just before the original next GEM bit. If yes, the polling routine moves to block 214. If no, then there is no new Uniform Error Packet to be created and the method continues in FIG. 2b.

In block 214, the GEM is saved in a uniform error packet (UEP). In block 216, the first bit that is on is located beginning at the next bit to be checked. The bit position is used to determine a branch to the general error handling in block 218. The determining a branch may be implemented with a look-up table. Examples may include separate error handling code for interfaces, thresholds, cache errors, recovery events, etc. In the general error handling, the LEMs associated with the detected GEM bit are saved into the UEP. The LEMs are inspected for error bits. If trap registers are available for the detected LEM bits, the trap registers are also read and saved in the UEP. If a threshold counter is being used to count the errors, the threshold counter is updated. The time that the LEMs and trap registers were read is also saved in the UEP, and the LEMs are reset. The uniform error packet is output in block 220. The method continues in FIG. 2b.

In FIG. 2b, in block 224, interval timers may be retrieved for the node associated with the polling routine. If the time interval has passed in block 226, thresholds, such as, for example error thresholds, are cleared in block 227. Once thresholds are cleared, a setup for a next polling routine call is initiated and the next GEM address and next error bit are updated in block 228. If the time interval has not passed in block 226, the method continues to block 228. In block 230 the routine is returned to the caller, in this case, the polling routine. 6

The use of UEP having error data, unique identifiers of the registers, and times associated with the data in the UEP to compile Uniform Error Summary files allows error data to be easily accessed archived, and analyzed. The advantages of a uniform system of compiling and archiving error data that uniquely identifies the error data from particular registers greatly increases the efficiency of analyzing error data in the processor 102. The amount of host firmware code 112 that has to be specifically written is minimized.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for processing errors comprising:
a processor comprising:
a first local fault isolation register having a first unique identifier, the first register operative to store a first error data;
a second local fault isolation register having a second unique identifier, the second register operative to store a second error data;
a global fault isolation register that summarizes a status of the first and second local fault isolation registers;
host firmware operative to retrieve the first error data from the first local fault isolation register, associate the first error data with the first unique identifier of the first local fault isolation register, retrieve the second error data from the second local fault isolation register, associate the second error data with the second unique identifier of the second local fault isolation register, retrieve status data from the global fault isolation register, and generate a first uniform error packet including the first error data and the first unique identifier of the first local fault isolation register, the second error data and the second unique identifier of the second local fault isolation register, and the status data from the global register; and
an error database storage medium operative to store a first uniform error summary compiled from the first uniform error packet; and
a processing device comprising an error database processing program that accesses the error database and analyzes the error data in the first uniform error summary.

2. The system of claim 1, wherein the processor is further operative to save time data associated with the retrieval of the error data in the first uniform error packet.

3. The system of claim 1, wherein the processor is further operative to compile a uniform error summary including the first uniform error packet, and save the uniform error summary.

4. The system of claim 3, wherein the system further comprises:
an error database communicatively linked to the processor operative to save the uniform error summary.

5. The system of claim 3, wherein the system further comprises a second processor communicatively linked to the processor operative to process the uniform error summary for error analysis.

6. The system of claim 4, wherein the error database is communicatively linked to a second processor operative to save a second uniform error summary from the second processor.

7. A method for analyzing processor error data comprising:
  determining if an error has occurred in a processor;
  retrieving a first error data stored in a first local fault isolation register;
  associating the first error data stored in the first local fault isolation register with a first unique identifier of the first local fault isolation register;
  saving the first error data with the first unique identifier of the first local fault isolation register;
  retrieving by a processor a second error data stored in a second local fault isolation register;
  associating the second error data stored in the second local fault isolation register with a second unique identifier of the second local fault isolation register;
  saving the second error data with the second unique identifier of the second local fault isolation register;
  generating a summary of a status of the first and second local fault isolation registers and saving the summary in a global fault isolation register;
  saving by host firmware the second error data with the second unique identifier of the second local fault isolation register and the first error data with the first unique identifier of the first local fault isolation register, and the summary of the status of the first and second local fault isolation registers in a uniform error packet;
  compiling a first uniform error summary and storing the first uniform error summary in an error database; and
  accessing by a processing device the error database and analyzing the error data in the first uniform error summary.

8. The method of claim 7, wherein the method further comprises saving time data associated with the retrieval of the error data in the uniform error packet.

9. The method of claim 7, wherein the method further comprises:
  compiling a uniform error summary including the uniform error data file; and
  saving the uniform error summary.

10. The method of claim 9, wherein the method further comprises:
  retrieving the uniform error summary; and
  analyzing the uniform error summary.

11. The method of claim 9, wherein the method further comprises:
  retrieving a second uniform error summary from a second processor; and
  analyzing the second uniform error summary.

12. A computer program product for providing real-time recommendations, the computer program product comprising:
  a computer-readable storage medium for storing instructions for executing a real-time recommendation service, the real-time recommendation service comprising a method of:
  determining if an error has occurred in a processor;
  retrieving a first error data stored in a first local fault isolation register;
  associating the first error data stored in the first local fault isolation register with a first unique identifier of the first local fault isolation register;
  saving the first error data with the first unique identifier of the first local fault isolation register;
  retrieving a second error data stored in a second local fault isolation register;
  associating the second error data stored in the second local fault isolation register with a second unique identifier of the second local fault isolation register;
  saving the second error data with the second unique identifier of the second local fault isolation register;
  generating a summary of a status of the first and second local fault isolation registers and saving the summary in a global fault isolation register;
  saving by host firmware the second error data with the second unique identifier of the second local fault isolation register and the first error data with the first unique identifier of the first local fault isolation register, and the summary of the status of the first and second local fault isolation registers in a uniform error packet;
  compiling a first uniform error summary and storing the first uniform error summary in an error database; and
  accessing by a processing device the error database and analyzing the error data in the first uniform error summary.

13. The computer program product of claim 12, wherein the real-time recommendation service further comprises saving time data associated with the retrieval of the error data in the uniform error packet.

14. The computer program product of claim 12, wherein the real-time recommendation service further comprises:
  compiling a uniform error summary including the uniform error packet; and
  saving the uniform error summary.

15. The computer program product of claim 12, wherein the real-time recommendation service further comprises:
  retrieving the uniform error summary; and
  analyzing the uniform error summary.

* * * * *